(12) United States Patent
Di Mella

(10) Patent No.: US 11,234,505 B2
(45) Date of Patent: Feb. 1, 2022

(54) COSMETIC APPLICATION ASSEMBLY

(71) Applicant: Danny Di Mella, Yonkers, NY (US)

(72) Inventor: Danny Di Mella, Yonkers, NY (US)

( * ) Notice: Subject to any disclaimer, the term of this patent is extended or adjusted under 35 U.S.C. 154(b) by 257 days.

(21) Appl. No.: 16/437,489

(22) Filed: Jun. 11, 2019

(65) Prior Publication Data
US 2020/0390221 A1 Dec. 17, 2020

(51) Int. Cl.
| | |
|---|---|
| *A45D 34/04* | (2006.01) |
| *A45D 40/26* | (2006.01) |
| *A45D 44/04* | (2006.01) |
| *A46B 5/00* | (2006.01) |
| *A46B 11/00* | (2006.01) |
| *A46B 11/08* | (2006.01) |
| *H05B 1/02* | (2006.01) |
| *H02J 7/00* | (2006.01) |

(52) U.S. Cl.
CPC ......... *A45D 34/042* (2013.01); *A45D 40/262* (2013.01); *A45D 44/04* (2013.01); *A46B 5/0037* (2013.01); *A46B 5/0095* (2013.01); *A46B 11/0062* (2013.01); *A46B 11/0086* (2013.01); *A46B 11/08* (2013.01); *H02J 7/0042* (2013.01); *H05B 1/0252* (2013.01); *A45D 2200/054* (2013.01); *A45D 2200/109* (2013.01); *A45D 2200/155* (2013.01); *A45D 2200/157* (2013.01); *A46B 2200/1046* (2013.01)

(58) Field of Classification Search
CPC ... A46B 5/0095; A46B 11/0062; A46B 11/08; A46B 11/0086; A46B 5/0037; A46B 2200/1046; A46B 11/00; A46B 11/001; A46B 11/002; A46B 11/0072; A45D 34/042; A45D 40/262; A45D 44/04; A45D 2200/155; A45D 2200/054; A45D 34/04; A45D 40/261; A45D 2200/109; A45D 2200/15; A45D 2200/157; H05B 1/0252; H05B 1/0269; H05B 1/0283; H02J 1/0042
USPC ....................................................... 401/1, 2
See application file for complete search history.

(56) References Cited

U.S. PATENT DOCUMENTS

| | | | | |
|---|---|---|---|---|
| 2,849,736 | A * | 9/1958 | Kohle | ..................... D06F 87/00 401/2 |
| 3,388,958 | A * | 6/1968 | Johnson | ............. A46B 11/0017 401/2 |
| 6,363,948 | B2 | 4/2002 | Choi | |
| 6,592,282 | B2 | 7/2003 | Fontanet | |
| 7,234,474 | B2 | 6/2007 | Byun | |
| 7,695,207 | B1 * | 4/2010 | Laghi | ..................... A46B 11/08 401/2 |

(Continued)

*Primary Examiner* — David J Walczak

(57) ABSTRACT

A cosmetic application assembly for heating, dispensing, and applying a cosmetic includes a handle that is tubular and defines a reservoir. Each of a plurality of brushes is selectively couplable to a first end of the handle. An opening that is positioned in a second end of the handle is configured to insert a cosmetic. A heating and dispensing module is selectively couplable to the second end of the handle and is in fluidic communication with the reservoir. The heating and dispensing module is configured to draw the cosmetic from the reservoir, to warm the cosmetic, and to dispense the cosmetic through a hole that is positioned in the heating and dispensing module. The user is positioned to apply the cosmetic to a skin surface and to utilize the handle to manipulate a respective brush that is coupled to the handle to spread the cosmetic.

15 Claims, 7 Drawing Sheets

(56) References Cited

U.S. PATENT DOCUMENTS

| | | |
|---|---|---|
| 8,230,543 B2 | 7/2012 | Shrier |
| 8,726,916 B2 | 5/2014 | Park |
| 9,462,871 B2 | 10/2016 | Machiorlette |
| D787,190 S | 5/2017 | Machiorlette |
| 10,799,015 B1 * | 10/2020 | Velazquez .............. A45D 27/04 |
| 2017/0071315 A1 | 3/2017 | Pires |

* cited by examiner

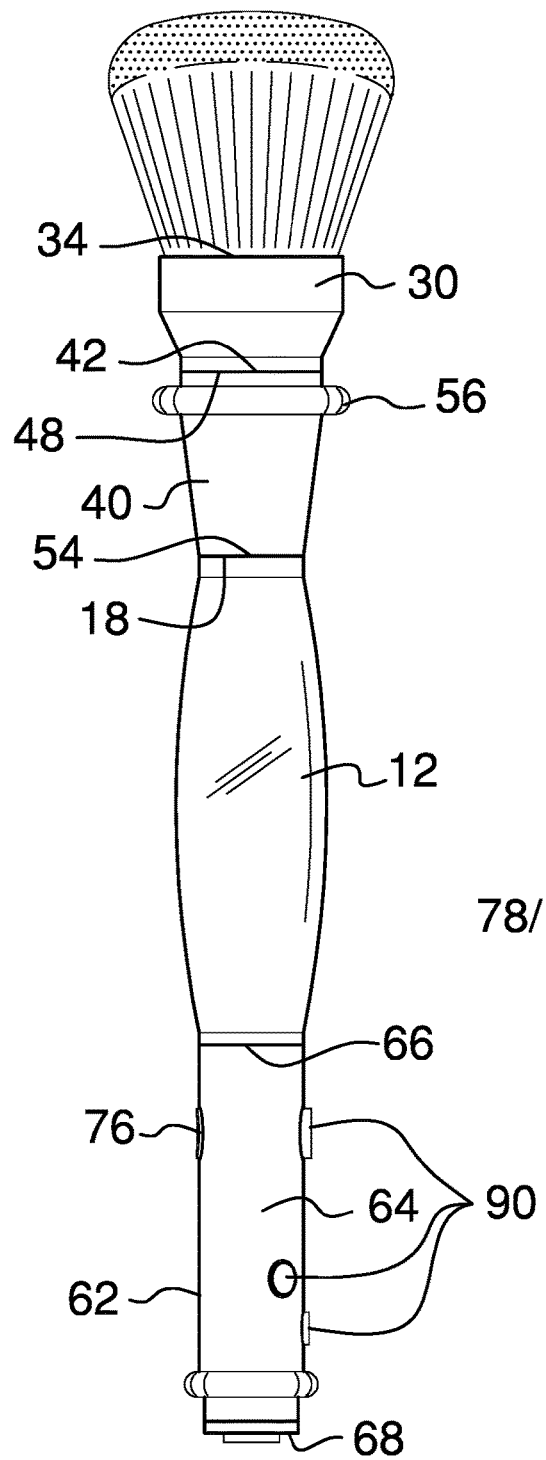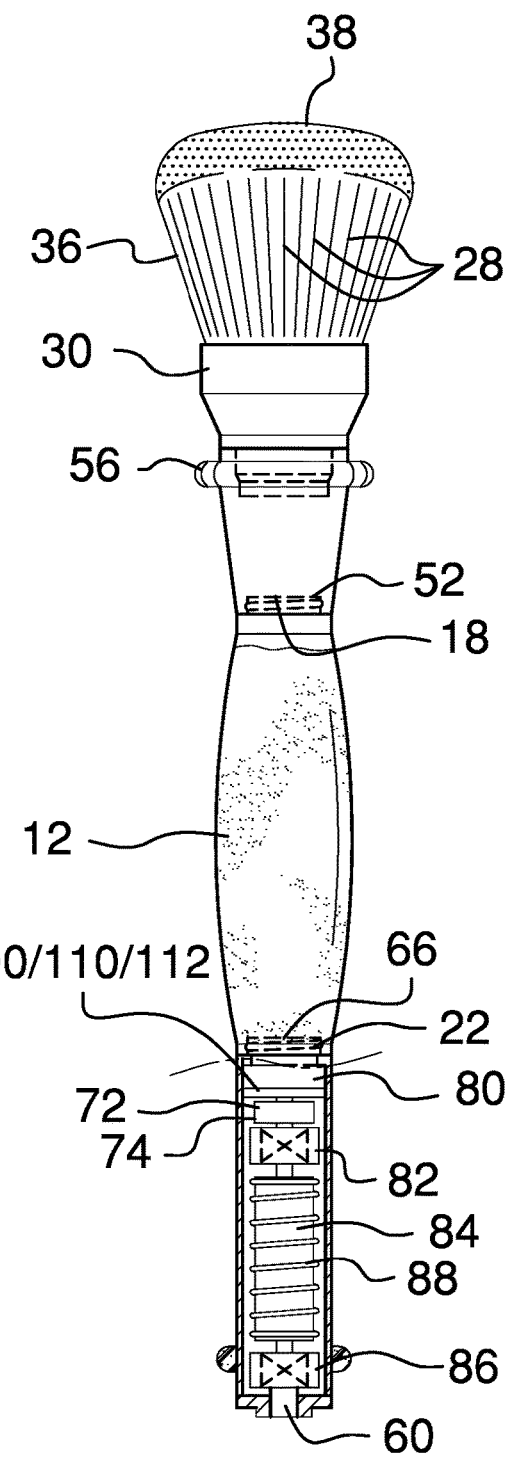
FIG. 3
FIG. 4

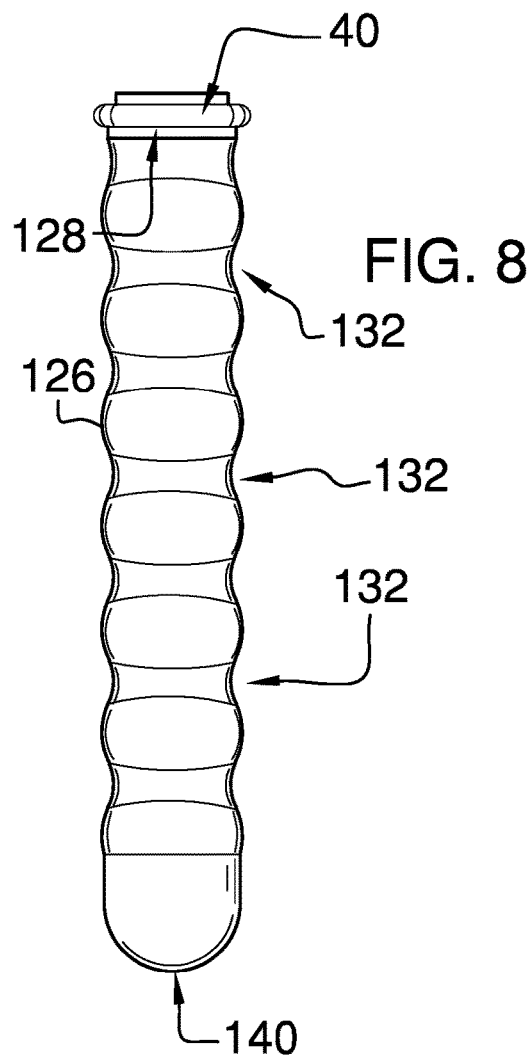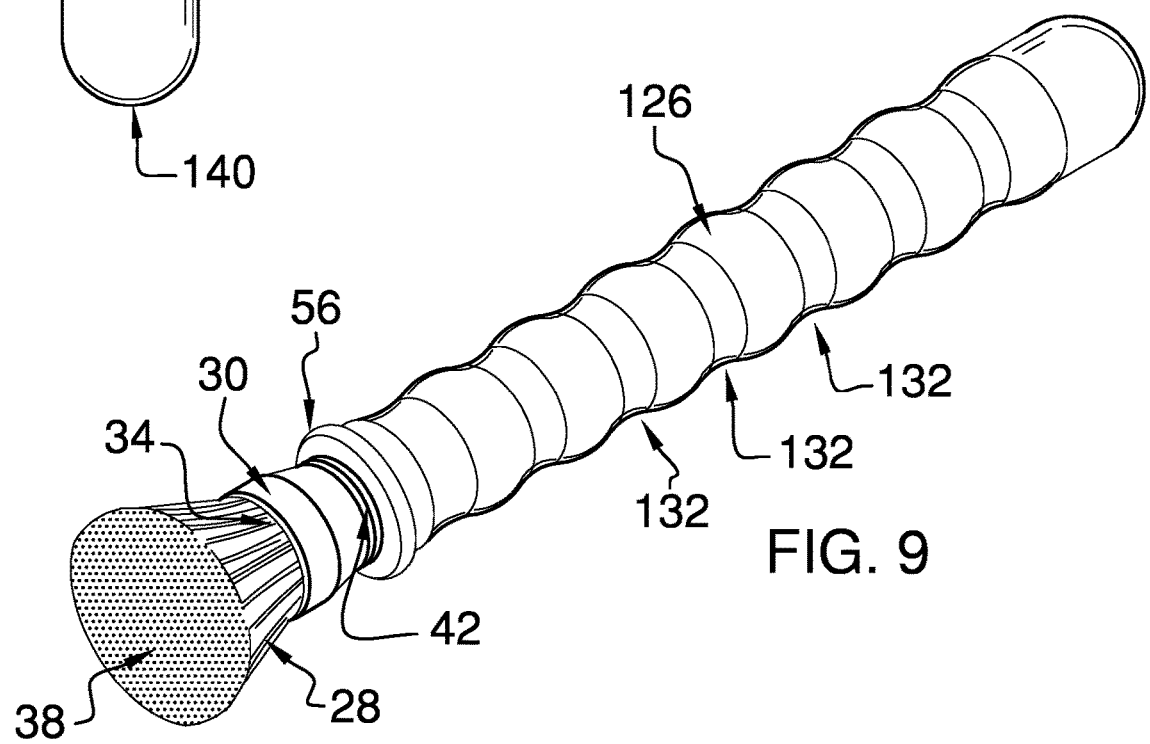

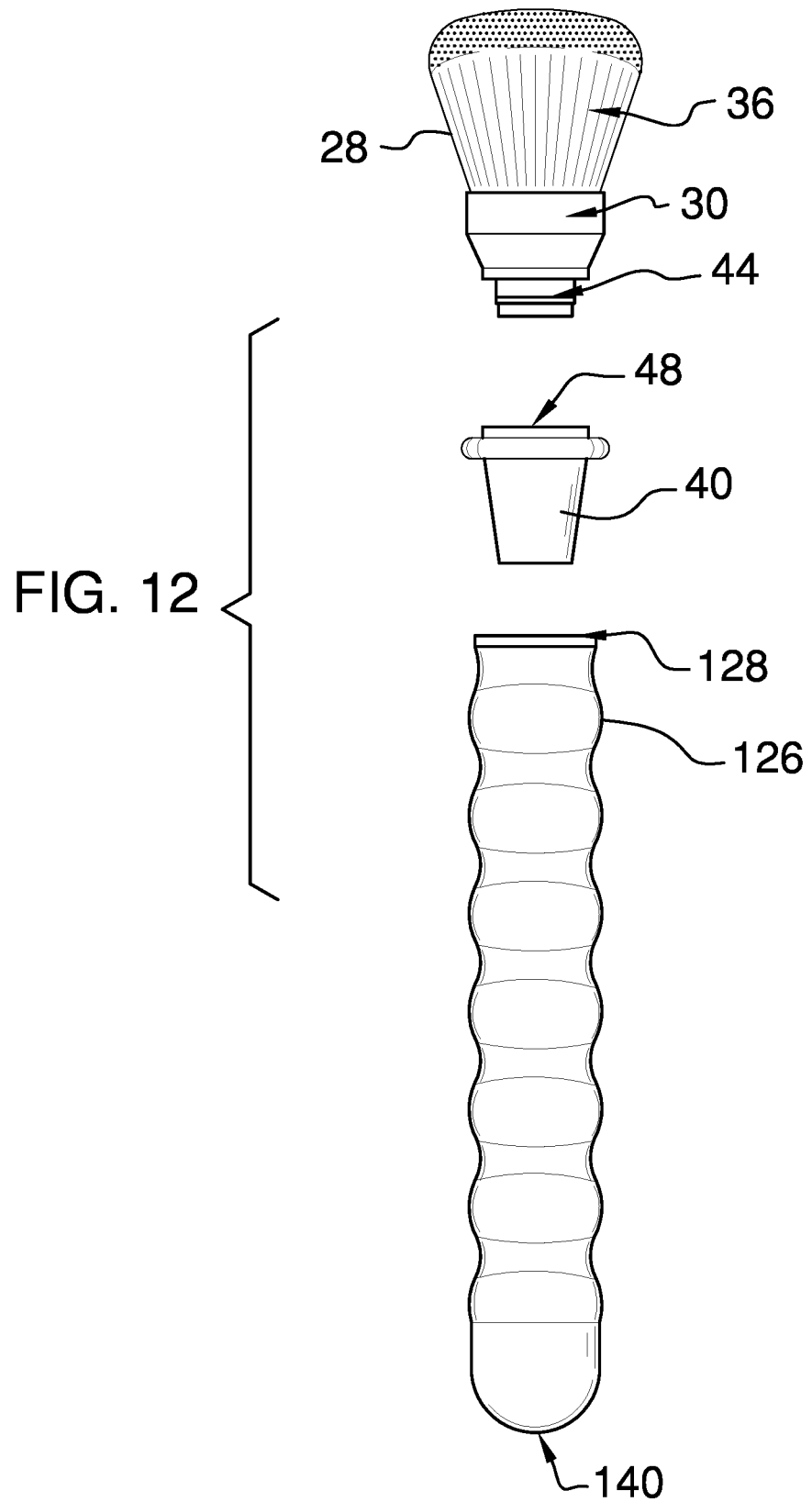

US 11,234,505 B2

COSMETIC APPLICATION ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relate to application assemblies and more particularly pertain to a new application assembly for heating, dispensing, and applying a cosmetic.

BRIEF SUMMARY OF THE INVENTION

An embodiment of the disclosure meets the needs presented above by generally comprising a handle that is tubular and defines a reservoir. Each of a plurality of brushes is selectively couplable to a first end of the handle. An opening that is positioned in a second end of the handle is configured to insert a cosmetic. A heating and dispensing module is selectively couplable to the second end of the handle and is in fluidic communication with the reservoir. The heating and dispensing module is configured to draw the cosmetic from the reservoir, to warm the cosmetic, and to dispense the cosmetic through a hole that is positioned in the heating and dispensing module. The user is positioned to apply the cosmetic to a skin surface and to utilize the handle to manipulate a respective brush that is coupled to the handle to spread the cosmetic.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a side view of an embodiment of the disclosure.

FIG. 4 is a cross-sectional view of an embodiment of the disclosure.

FIG. 8 is a side view of an embodiment of the disclosure.

FIG. 9 is an isometric perspective view of an embodiment of the disclosure.

FIG. 12 is an exploded view of an embodiment of the disclosure.

DETAILED DESCRIPTION OF THE INVENTION

Figure 1:
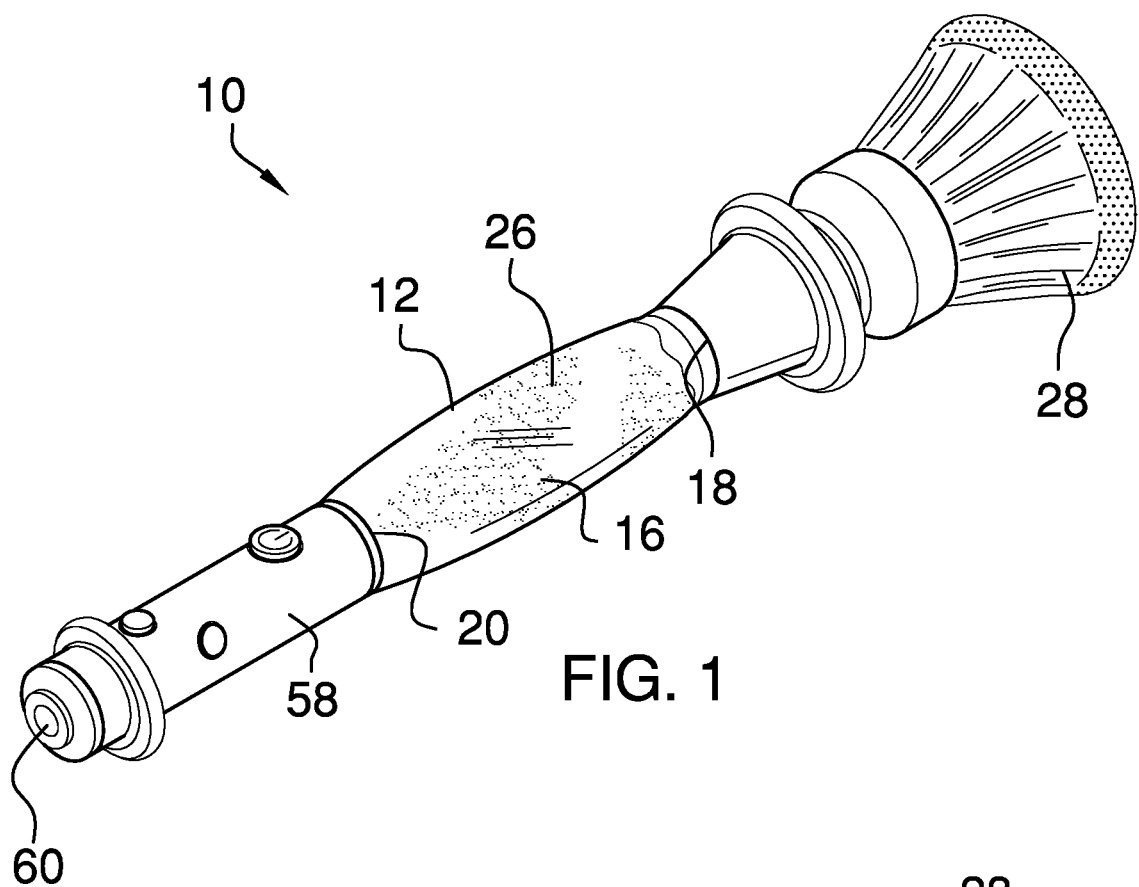
FIG. 1 is an isometric perspective view of a cosmetic application assembly according to an embodiment of the disclosure.
Figure 2:
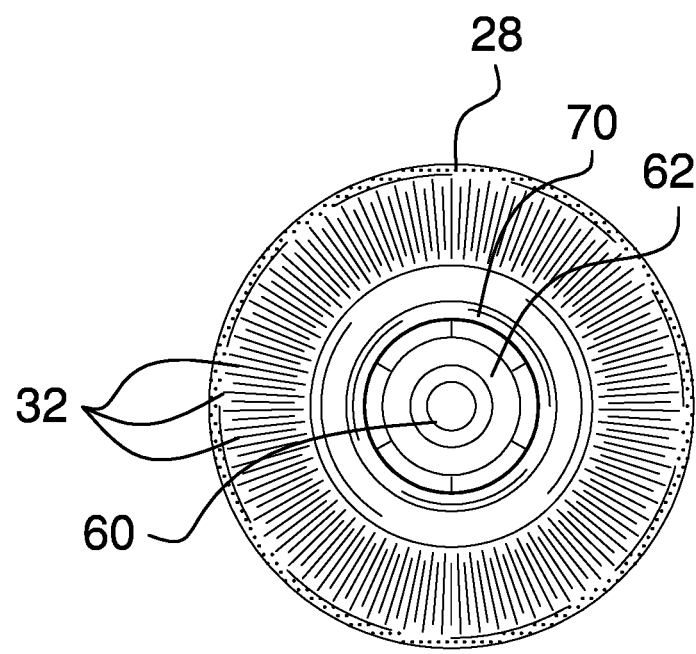
FIG. 2 is an end view of an embodiment of the disclosure.

With reference now to the drawings, and in particular to FIGS. 1 through 7 thereof, a new application assembly embodying the principles and concepts of an embodiment of the disclosure and generally designated by the reference numeral 10 will be described.

As best illustrated in FIGS. 1 through 7, the cosmetic application assembly 10 generally comprises a handle 12 that is tubular so that the handle 12 defines a reservoir 14 that is configured to position a cosmetic, such as foundation. The handle 12 comprises an annular wall 16 that extends arcuately between a first end 18 and a second end 20 of the handle 12. The handle 12 is externally threaded proximate to the first end 18. An opening 22, which is internally threaded, is positioned in the second end 20 of the handle 12 and is configured to insert the cosmetic into the reservoir 14. A cap 24, which is complementary to the opening 22, is positioned to be threadedly inserted into the opening 22 to seal the reservoir 14.

A grip 26 is coupled to the handle 12. The grip 26 comprises at least one of rubber and silicone so that the grip 26 is resiliently compressible. The grip 26 is configured to enhance a grasp of a hand of a user upon the handle 12.

Figure 6:
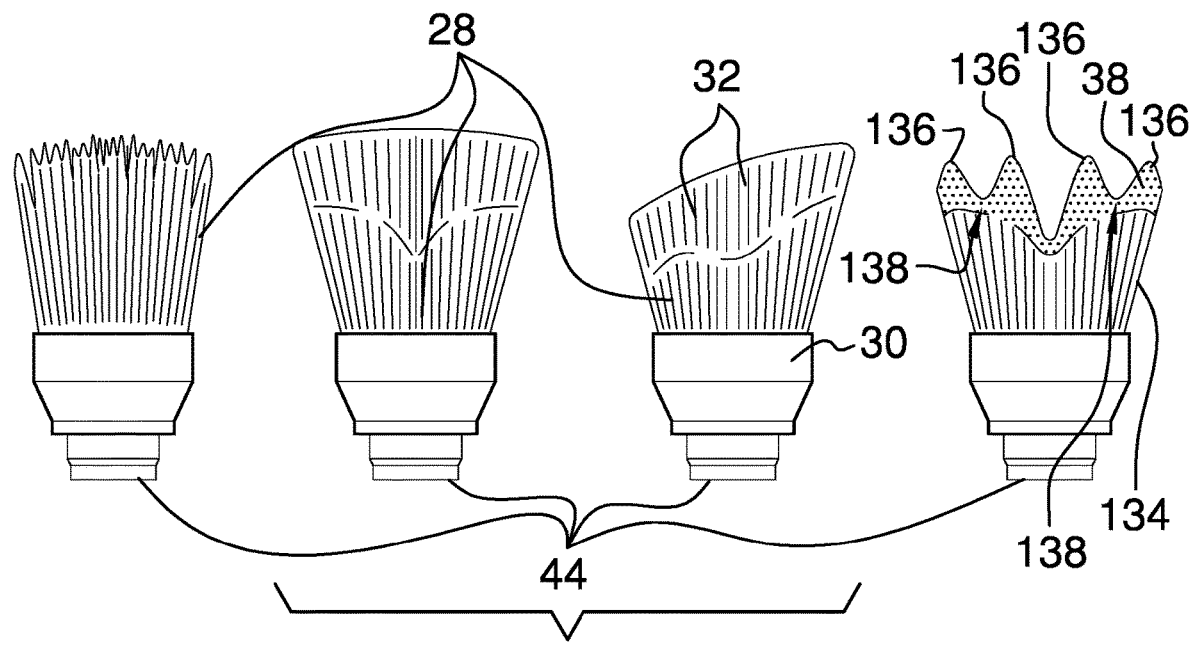
FIG. 6 is a side view of an embodiment of the disclosure.

Each of a plurality of brushes 28 is selectively couplable to a first end 18 of the handle 12. Each brush 28 comprises a base 30 and a plurality of bristles 32. The base 30 is paramagnetic. Each bristle 32 is coupled to and extends from a first face 34 of the base 30. Each bristle 32 of the plurality of bristles 32 has a respective length 36 so that the plurality of bristles 32 comprises bristles 32 that have a variety of lengths 36 that define an associated contour 38. Thus, the plurality of brushes 28 comprises brushes 28 that have a variety of contours 38, as shown in FIG. 6. In particular, the plurality of brushes 28 comprises a contoured brush 134, which fulfills an unmet need in application of makeup. The contour 38 of the contoured brush 134 defines a set of four small protrusions 136 and a pair of large protrusions 138.

A connector 40 is selectively couplable to a second face 42 of a respective base 30 and to the first end 18 of the handle 12. The connector 40 is positioned to couple to the respective base 30 and to the handle 12 to couple an associated brush 28 to the handle 12. The connector 40 is magnetized so that the connector 40 is positioned to magnetically couple to the base 30 of the associated brush 28.

Figure 5:
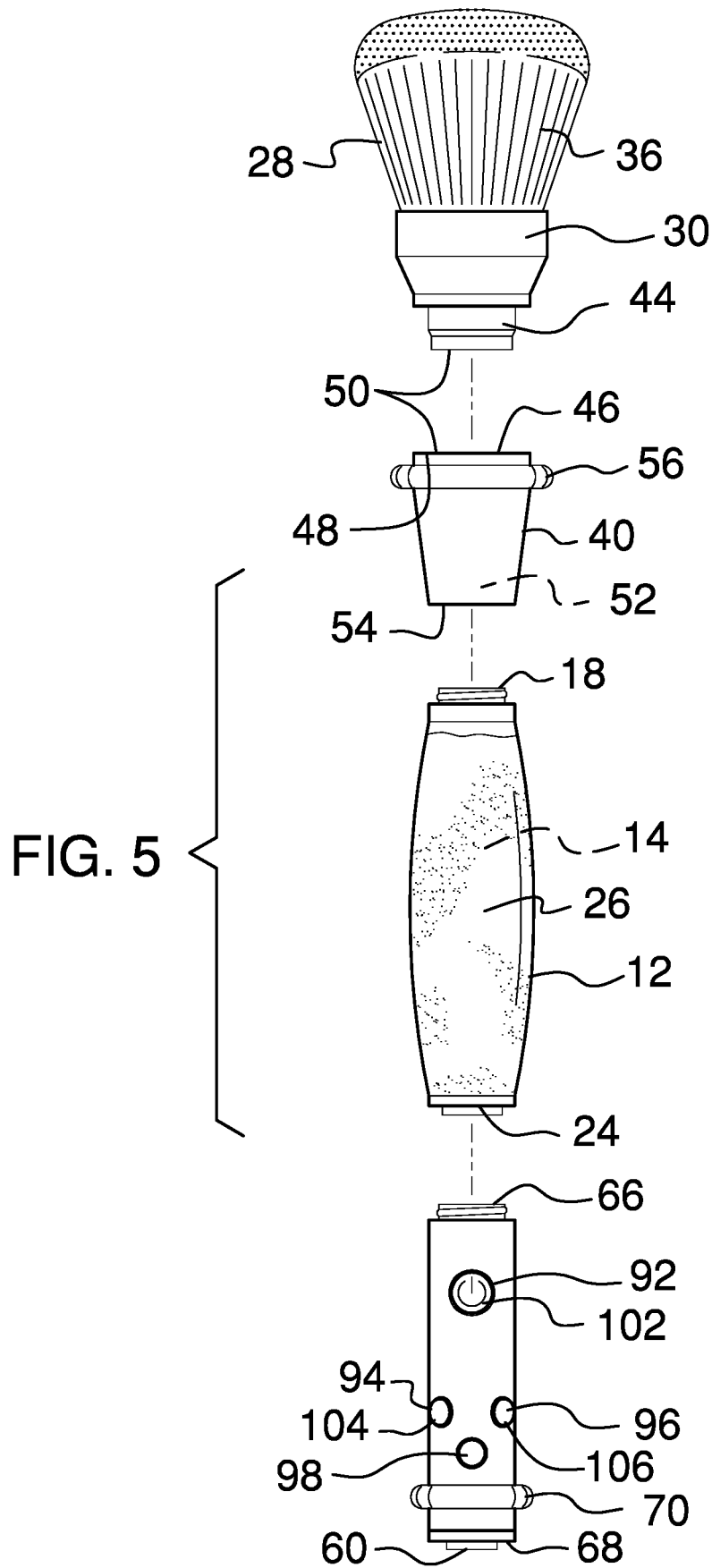
FIG. 5 is an exploded view of an embodiment of the disclosure.

Each of a plurality of first couplers 44 is coupled to the second face 42 of a respective base 30. A second coupler 46 is coupled to an upper end 48 of the connector 40. The second coupler 46 is complementary to the first couplers 44. The second coupler 46 is configured to couple to a respective first coupler 44 to couple an associated brush 28 to the connector 40. The second coupler 46 and the respective first coupler 44 comprise a quick-connector 50, as shown in FIG. 5. The quick-connector 50 allows a user to quickly connect a brush 28 of the user's choice to the handle 12. As the brush 28 is readily detachable from the handle 12, cleaning of the brush 28 is facilitated and there is no risk of cleaning water diluting the cosmetic.

A recess 52 extends into a lower end 54 of the connector 40. The recess 52 is internally threaded so that the recess 52 is positioned to threadedly insert the first end 18 of the handle 12 to removably couple the connector 40 to the handle 12.

A ring 56 is coupled to the connector 40 proximate to the upper end 48. The ring 56 comprises at least one of rubber and silicone so that the ring 56 is resiliently compressible. The ring 56 is configured to reduce an impact in event of droppage.

A heating and dispensing module 58 is selectively couplable to the second end 20 of the handle 12 and is in fluidic communication with the reservoir 14. The heating and dispensing module 58 is configured to draw the cosmetic from the reservoir 14, to warm the cosmetic, and to dispense the cosmetic through a hole 60 that is positioned in the heating and dispensing module 58. The user is positioned to apply the cosmetic to a skin surface and to utilize the handle 12 to manipulate a respective brush 28 that is coupled to the handle 12 to spread the cosmetic.

The heating and dispensing module 58 comprises a housing 62 that defines an internal space 64. The housing 62 is externally threaded adjacent to a first endpoint 66 of the housing 62 so that the first endpoint 66 is threadedly insertable into the opening 22 to removably couple the housing 62 to the second end 20 of the handle 12. The hole 60 is positioned in a second endpoint 68 of the housing 62.

With the connector 40 being positioned to selectively couple to any of the brushes 28 and to the handle 12, and with the housing 62 being removably couplable to the handle 12, several options for the handle 12 exist. The handle 12 may be permanent and the cosmetic inserted through the opening 22, either directly or in pouch form. The handle 12 also may be purchased preloaded with the cosmetic and the cap 24 positioned in the opening 22. In this case, the handle 12 would be disposed of when the cosmetic is exhausted.

A disc 70 is positioned around and is coupled to the housing 62 proximate to the second endpoint 68. The disc 70 comprises at least one of rubber and silicone so that the disc 70 is resiliently compressible. The disc 70 is configured to reduce the impact in the event of droppage.

A power module 72 is coupled to the housing 62 and is positioned in the internal space 64. The power module 72 comprises a battery 74 that is rechargeable. A port 76 is positioned in the housing 62 and is operationally coupled to the battery 74. The port 76 is configured to insert a plug of a charging cord that is coupled to a source of electrical current to charge the battery 74.

A microprocessor 78 is coupled to the housing 62 and is positioned in the internal space 64. The microprocessor 78 is operationally coupled to the power module 72. A pump 80 is coupled to the housing 62 and is positioned in the internal space 64 proximate to the first endpoint 66 so that the pump 80 is in fluidic communication with the reservoir 14. The pump 80 is operationally coupled to the microprocessor 78.

A first valve 82 is coupled pump 80 so that the first valve 82 is in fluidic communication with the pump 80. The first valve 82 is operationally coupled to the microprocessor 78. A tube 84 is coupled to the first valve 82 and extends through the internal space 64 toward the second endpoint 68 of the housing 62. A second valve 86 is coupled to tube 84 distal from the first valve 82 so that the second valve 86 is in fluidic communication with the first valve 82 and the hole 60. The second valve 86 is operationally coupled to the microprocessor 78.

A heating element 88 is coiledly positioned around the tube 84 and is operationally coupled to the microprocessor 78, as shown in FIG. 4. The microprocessor 78 is positioned to selectively actuate the pump 80 and the first valve 82 to draw the cosmetic from the reservoir 14 into the tube 84, positioning the microprocessor 78 to actuate the heating element 88 to warm the cosmetic so that the cosmetic is flowable. The microprocessor 78 is positioned to actuate the second valve 86 so that the cosmetic flows through the hole 60, positioning the user to apply the cosmetic to the skin surface and to utilize the handle 12 to manipulate the respective brush 28 that is coupled to the handle 12 to spread the cosmetic.

A controller 90 is coupled to the housing 62 and is operationally coupled to the microprocessor 78. The controller 90 is positioned to input commands into the microprocessor 78 to selectively actuate the power module 72, the pump 80, the first valve 82, the heating element 88, and the second valve 86.

The controller 90 comprises a first button 92, a second button 94, a third button 96, and fourth button 98, all of which are depressible, as shown in FIG. 5. The first button 92 is configured to be depressed to signal the microprocessor 78 to actuate the power module 72. The second button 94 is configured to be depressed to signal the microprocessor 78 to actuate the pump 80 and the first valve 82 to draw the cosmetic into the tube 84. The third button 96 is configured to be depressed to signal the microprocessor 78 to actuate the heating element 88 to heat the cosmetic. The fourth button 98 is configured to be depressed to signal the microprocessor 78 to actuate the second valve 86 to release the cosmetic through the hole 60.

Timer programming code 100 that is positioned on the microprocessor 78 comprises an associated time limit for each of the first button 92, the second button 94, the third button 96, and the fourth button 98. The associated time limit corresponds to a time interval for which the first button 92, the second button 94, the third button 96, or the fourth button 98 must be depressed to signal the microprocessor 78. The time interval helps to prevent inadvertent signals from being sent to the microprocessor 78.

A first light emitting diode 102 that is imbedded in the first button 92 and a second light emitting diode 104 that is imbedded in the second button 94 are configured to emit blue light. A third light emitting diode 106 that is imbedded in the third button 96 is configured to selectively emit green light and red light.

A power programming code that is positioned on the microprocessor 78 enables the microprocessor 78 to signal the first light emitting diode 102 to illuminate upon the first button 92 being depressed for the associated time limit.

Loading programming code 110 that is positioned on the microprocessor 78 enables the microprocessor 78 to signal the second light emitting diode 104 to intermittently illuminate upon the second button 94 being depressed for the associated time limit and to enable the microprocessor 78 to signal the second light emitting diode 104 to illuminate upon the first valve 82 being deactivated by the microprocessor 78.

Heating programming code 112 that is positioned on the microprocessor 78 enables the microprocessor 78 to signal the third light emitting diode 106 to emit red light upon the third button 96 being depressed for the associated time limit and enables the microprocessor 78 to signal the third light emitting diode 106 to emit green light upon the heating element 88 being deactivated by the microprocessor 78. The emission of green light signals to the user that the cosmetic has completed the heating process and is ready for use.

Figure 7:
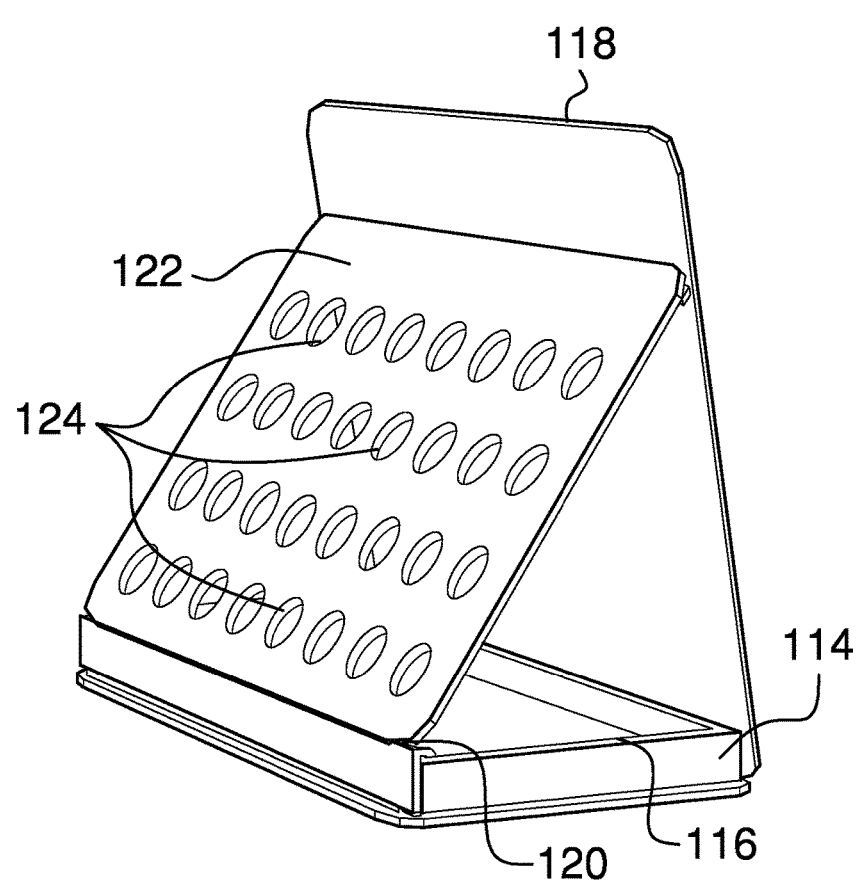
FIG. 7 is an isometric perspective view of an embodiment of the disclosure.
Figure 10:
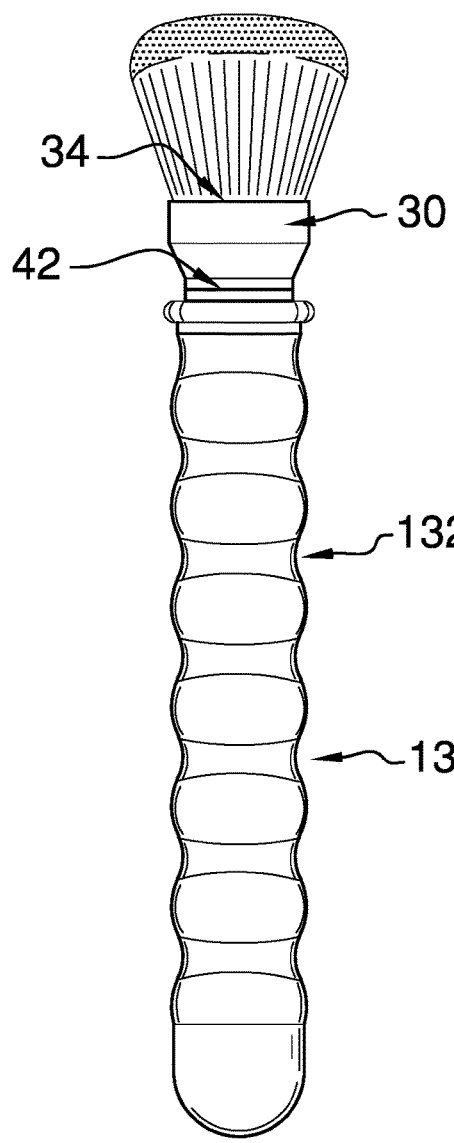
FIG. 10 is a side view of an embodiment of the disclosure.
Figure 11:
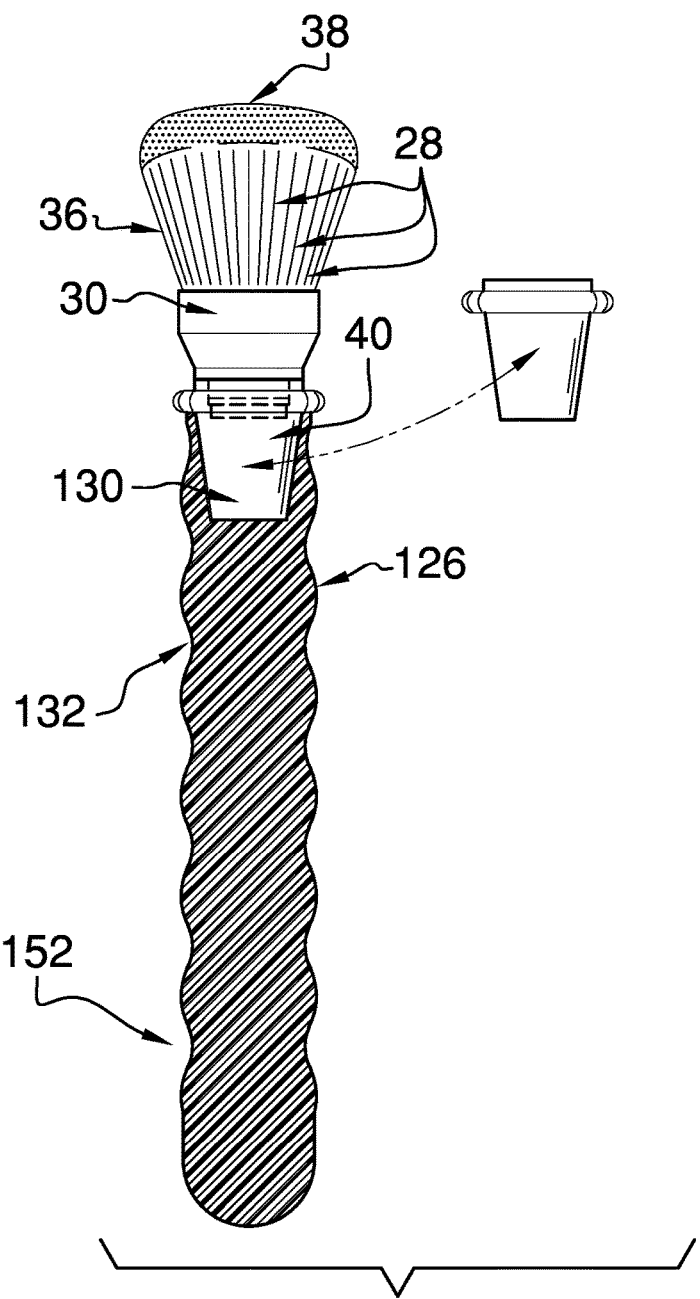
FIG. 11 is a cross-sectional view of an embodiment of the disclosure.

The assembly 10 also comprises a box 114 that has a top 116, which is open, as shown in FIG. 7. A lid 118 is hingedly coupled to the box 114 and is positioned to selectively close the top 116. A hinge 120 that is coupled to the box 114 is opposingly positioned on the box 114 relative to the lid 118. The hinge 120 is spring-loaded. A panel 122 is coupled to the hinge 120 so that the panel 122 is selectively positionable in a stowed configuration within the box 114 and a deployed configuration, wherein the panel 122 extends transversely from the top 116 to the lid 118. The panel 122 is magnetized. A plurality of apertures 124 is positioned in the panel 122. Each aperture 124 is complementary to a respective base 30 and is positioned to insert the respective base 30 to magnetically couple an associated brush 28 to the panel 122.

The assembly 10 also comprises a handgrip 126, as shown in FIGS. 8-12. The connector 40 is selectively couplable to a first terminus 128 of the handgrip 126 so that the connector 40 is positioned to couple to a base 30 of a respective brush 28 and to the handgrip 126 to couple the respective brush 28 to the handgrip 126. A plurality of indentations 132 that is positioned in the handgrip 126 is configured to enhance a grasp of the hand of the user upon the handgrip. The indentations 132, being substantially evenly spaced between the first terminus 128 and a second terminus 140 of the handgrip 126, are configured to allow insertion of associated digits of the hand, thus allowing the user to selectively position the hand between the first terminus 128 and the second terminus 140.

A void 130 extends into the handgrip 126 from the first terminus 128 of the handgrip 126. The void 130 is substantially complementary to the connector 40 so that the void 130 is positioned to insert the connector 40, with the upper end 48 of the connector 40 protruding from the terminus 128, to frictionally couple the connector 40 to the handgrip 126. The connector 40 also may be fixedly coupled to the handgrip 126 by any of a number of methods, including gluing.

In use, the first button 92 is depressed to signal the microprocessor 78 to actuate the power module 72. The second button 94 is depressed to signal the microprocessor 78 to actuate the pump 80 and the first valve 82 to draw the cosmetic into the tube 84. The third button 96 is depressed to signal the microprocessor 78 to actuate the heating element 88 to heat the cosmetic. The fourth button 98 is depressed to signal the microprocessor 78 to actuate the second valve 86 to release the cosmetic through the hole 60, positioning the user to apply the cosmetic to the skin surface and to utilize the handle 12 to manipulate the respective brush 28 that is coupled to the handle 12 to spread the cosmetic.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cosmetic application assembly comprising:
a handle, the handle being tubular such that the handle defines a reservoir wherein the reservoir is configured for positioning a cosmetic;
a plurality of brushes, each brush being selectively couplable to a first end of the handle;
an opening positioned in a second end of the handle wherein the opening is configured for inserting the cosmetic into the reservoir; and
a heating and dispensing module selectively couplable to the second end of the handle such that the heating and dispensing module is in fluidic communication with the reservoir wherein the heating and dispensing module is configured for drawing the cosmetic from the reservoir, for warming the cosmetic, and for dispensing the cosmetic through a hole positioned in the heating and dispensing module, positioning a user for applying the cosmetic to a skin surface and for utilizing the handle for manipulating a respective brush coupled to the handle for spreading the cosmetic.

2. The assembly of claim 1, further including the handle comprising an annular wall, the annular wall extending arcuately between the first end and the second end of the handle.

3. The assembly of claim 1, further comprising:
the opening being internally threaded; and
a cap complementary to the opening wherein the cap is positioned for threadedly inserting into the opening for sealing the reservoir.

4. The assembly of claim 3, further including the heating and dispensing module comprising:
a housing defining an internal space, the housing having a first endpoint, the housing being externally threaded adjacent to the first endpoint such that the first endpoint is threadedly insertable into the opening for removably coupling the housing to the second end of the handle, the hole being positioned in a second endpoint of the housing;

a power module coupled to the housing and positioned in the internal space;

a microprocessor coupled to the housing and positioned in the internal space, the microprocessor being operationally coupled to the power module;

a pump coupled to the housing and positioned in the internal space proximate to the first endpoint such that the pump is in fluidic communication with the reservoir, the pump being operationally coupled to the microprocessor;

a first valve coupled pump such that the first valve is in fluidic communication with the pump, the first valve being operationally coupled to the microprocessor, a tube coupled to the first valve and extending through the internal space toward the second endpoint of the housing;

a second valve coupled to the tube distal from the first valve such that the second valve is in fluidic communication with the first valve and the hole, the second valve being operationally coupled to the microprocessor;

a heating element coiledly positioned around the tube, the heating element being operationally coupled to the microprocessor wherein the microprocessor is positioned for selectively actuating the pump and the first valve for drawing the cosmetic from the reservoir into the tube positioning the microprocessor for actuating the heating element for warming the cosmetic such that the cosmetic is flowable wherein the microprocessor is positioned for actuating the second valve such that the cosmetic flows through the hole positioning the user for applying the cosmetic to the skin surface and for utilizing the handle for manipulating the respective brush coupled to the handle for spreading the cosmetic; and a controller coupled to the housing, the controller being operationally coupled to the microprocessor wherein the controller is positioned for inputting commands into the microprocessor for selectively actuating the power module, the pump, the first valve, the heating element, and the second valve.

5. The assembly of claim 4, further including comprising:
the power module comprising a battery, the battery being rechargeable; and
a port positioned in the housing, the port being operationally coupled to the battery wherein the port is configured for inserting a plug of a charging cord coupled to a source of electrical current for charging the battery.

6. The assembly of claim 4, further including the controller comprising:
a first button, the first button being depressible wherein the first button is configured for depressing for signaling the microprocessor for actuating the power module;
a second button, the second button being depressible wherein the second button is configured for depressing for signaling the microprocessor for actuating the pump and the first valve;
a third button, the third button being depressible wherein the third button is configured for depressing for signaling the microprocessor for actuating the heating element; and a fourth button, the fourth button being depressible wherein the fourth button is configured for depressing for signaling the microprocessor for actuating the second valve.

7. The assembly of claim 6, further including timer programming code positioned on the microprocessor, the timer programming code comprising an associated time limit for each of the first button, the second button, the third button, and the fourth button wherein the associated time limit corresponds to a time interval for which the first button, the second button, the third button, or the fourth button must be depressed for signaling the microprocessor.

8. The assembly of claim 7, further comprising:
a first light emitting diode imbedded in the first button wherein the first light emitting diode is configured for emitting blue light;
power programming code positioned on the microprocessor, the power programming code enabling the microprocessor for signaling the first light emitting diode for illuminating upon the first button being depressed for the associated time limit;
a second light emitting diode imbedded in the second button wherein the second light emitting diode is configured for emitting blue light;
loading programming code positioned on the microprocessor, the loading programming code enabling the microprocessor for signaling the second light emitting diode for intermittently illuminating upon the second button being depressed for the associated time limit and enabling the microprocessor for signaling the second light emitting diode for illuminating upon the first valve being deactivated by the microprocessor;
a third light emitting diode imbedded in the third button wherein the third light emitting diode is configured for selectively emitting green light and red light; and
heating programming code positioned on the microprocessor, the heating programming code enabling the microprocessor for signaling the third light emitting diode for emitting red light upon the third button being depressed for the associated time limit and enabling the microprocessor for signaling the third light emitting diode for emitting green light upon the heating element being deactivated by the microprocessor.

9. The assembly of claim 4, further including a disc positioned around and coupled to the housing proximate to the second endpoint, the disc comprising at least one of rubber and silicone such that the disc is resiliently compressible wherein the disc is configured for reducing the impact in the event of droppage.

10. The assembly of claim 1, further including a grip coupled to the handle, the grip comprising at least one of rubber and silicone such that the grip is resiliently compressible wherein the grip is configured for enhancing a grasp of a hand of the user upon the handle.

11. The assembly of claim 1, further including each brush comprising a base and a plurality of bristles, each bristle being coupled to and extending from a first face of the base, each bristle of the plurality of bristles having a respective length such that the plurality of bristles comprises bristles having a variety of lengths defining an associated contour wherein the plurality of brushes comprises brushes having a variety of contours.

12. The assembly of claim 11, comprising:
a connector selectively couplable to a second face of a respective base and to the first end of the handle, the connector being magnetized such that the connector is positioned for magnetically coupling to the base of the associated brush;
a plurality of first couplers, each first coupler being coupled to the second face of a respective base; and
a second coupler coupled to an upper end of the connector, the second coupler being complementary to the first couplers wherein the second coupler is configured for coupling to a respective first coupler for coupling an associated brush to the connector.

13. The assembly of claim 12, further including the second coupler and the respective first coupler comprising a quick-connector.

14. The assembly of claim 12, further including comprising:
the handle being externally threaded proximate to the first end;
a recess extending into a lower end of the connector, the recess being internally threaded such that the recess is positioned for threadedly inserting the first end of the handle for removably coupling the connector to the handle; and
a ring coupled to the connector proximate to an upper end of the connector, the ring comprising at least one of rubber and silicone such that the ring is resiliently compressible wherein the ring is configured for reducing an impact in event of droppage.

15. The assembly of claim 12, further comprising:
the base being paramagnetic;
a box having a top, the top being open;
a lid hingedly coupled to the box wherein the lid is positioned for selectively closing the top;
a hinge coupled to the box, the hinge being opposingly positioned on the box relative to the lid, the hinge being spring-loaded;
a panel coupled to the hinge such that the panel is selectively positionable in a stowed configuration within the box and a deployed configuration wherein the panel extends transversely from the top to the lid, the panel being magnetized; and
a plurality of apertures positioned in the panel, each aperture being complementary to a respective base wherein the aperture is positioned for inserting the respective base for magnetically coupling an associated brush to the panel.

\* \* \* \* \*